United States Patent [19]

Garcia-Huidobro et al.

[11] Patent Number: 5,013,449
[45] Date of Patent: May 7, 1991

[54] PROCESS FOR SOLUTE RECOVERY UTILIZING RECYCLE LIQUIDS HAVING A STORED CONCENTRATION PROFILE

[75] Inventors: Gonzalo Garcia-Huidobro, Santiago, Chile; Douglas C. Greminger, Midland, Mich.

[73] Assignee: The Dow Chemical Company, Midland, Mich.

[21] Appl. No.: 358,738

[22] Filed: May 26, 1989

[51] Int. Cl.$^5$ .............................................. B01D 15/00
[52] U.S. Cl. .................................. 210/672; 210/677; 210/688
[58] Field of Search ...................... 210/672, 677, 688

[56] References Cited

U.S. PATENT DOCUMENTS

| | | | |
|---|---|---|---|
| 3,448,043 | 6/1969 | Vajna | 210/677 |
| 4,018,677 | 4/1977 | Himsley | 210/33 |
| 4,108,766 | 8/1978 | Vajna | 210/677 |
| 4,198,295 | 4/1980 | Vajna | 210/672 |

OTHER PUBLICATIONS

Kenneth C. Jones et al., "Copper Recovery from Acidic Leach Liquors by Continuous Ion-Exchange and Electrowinning", *Journal of Metals*, vol. 31, No. 4, Apr. 1979, pp. 19–25.

C. Palmer et al., "Design and Operation of Continuous Ion Exchange Process for Treating Uranium Mine Water", presented at the 45th Annual Meeting of the International Water Conference, Pittsburgh, Pa., Oct. 22–24, 1984.

Himsley Engineering Ltd., "CMPBIX", *Ion Exchange Update*.

*Primary Examiner*—Ivars Cintins

[57] ABSTRACT

The process of the invention is an adsorptive solute recovery from a dilute solution that, during elution of the adsorbent bed, stores for recycling donor and receiver portions of effluent from the bed that range in concentration from barren to just less than product concentration and just less than product concentration to barren, respectively. The donor and receiver liquids are stored such that their solute concentration profiles as they leave the bed are maintained. The donor liquid is recycled through the adsorbent bed just prior to elution while the bed is treated with the receiver liquid after elution. Steady state operation is established after a number of loading and elution cycles, resulting in improved recovery of solute, reduced recycle rates and lower adsorbent inventory requirements.

14 Claims, No Drawings

PROCESS FOR SOLUTE RECOVERY UTILIZING RECYCLE LIQUIDS HAVING A STORED CONCENTRATION PROFILE

BACKGROUND OF THE INVENTION

1. Field of the Invention

The invention relates to processes for recovering or removing solutes from dilute solutions using adsorbent beds.

2. Prior Art

Processes that use adsorbent beds of, for example, ion exchange resin beads to recover metals from natural mine drainage, leachate from piles of ore or process streams from acid leach tanks are known. The adsorbent resin bed after loading with metal values is eluted to produce a concentrated solution suitable for further processing to yield, for example, the pure metal. The resulting solution may, for example, be fed to a conventional electrowinning cell.

A number of processes have been developed for copper recovery that employ moving beds of chelation resins. That is, a portion of the resin bed is removed from a continuously loading resin column for elution of the desired metal. These beds achieve high metal recovery but are characterized by high attrition of expensive chelation resin through breakage of the resin beads during transport to and from the elution column.

A recent moving bed process, described by Himsley in U.S. Pat. No. 4,018,677 avoids valving and other restrictions that destroy the chelation resin beads but achieves only moderate copper recovery. In addition, the Himsley moving bed requires a large resin inventory which requirement adversely effects process economics.

Thus, present adsorptive processes for recovering metals from dilute process or mining streams lack a simultaneous solution to the problems of adequate metal recovery, a reasonable resin inventory and a satisfactory useful life of the resin in the process.

SUMMARY OF THE INVENTION

The present invention is an adsorptive process for solute recovery from dilute solutions that is characterized by high solute recovery, reduced adsorbent or resin inventory and low adsorbent or resin attrition. The attrition problem is substantially eliminated by employing a fixed bed that does not require movement of the adsorbent or resin for regeneration or elution.

The high recovery rate and reduced resin inventory requirements are achieved by a reduced volume recycling and washing method that employs certain bed effluent portions from the elution cycle, each portion stored such that the individual portion maintains a concentration profile of the solute to be recovered, after the system has reached steady state.

The process requires first passing the dilute solution through a suitable adsorbent bed wherein the adsorbent is loaded with the solute, which may, for example, be a metal such as copper, producing an effluent that is substantially barren with respect to concentration of solute. The process then proceeds with eluting the bed with a strong electrolyte or other eluent composition that causes desorption of the solute from the resin. The effluent from the bed is separated into effluent portions having solute concentration profiles including (1) a donor portion ranging in concentration from barren of solute to a concentration just less than a desired product concentration, (2) a product portion having a desired concentration of solute, and (3) a receiver portion having a concentration ranging from just less than product to barren concentration. The product portion is the concentrated product produced by the adsorbent or resin bed that is directed to as a further recovery process, such as electrowinning for a metal solute.

The donor and receiver effluent portions are separately stored, without mixing, such that each portion maintains the concentration profile it possessed as it leaves the resin bed.

In subsequent loading and elution cycles, after being loaded with solute, the bed is treated with the stored donor portion of the elution effluent, with the result that the amount of solute adsorbed by the bed is increased. A first portion of the bed effluent resulting from the donor treatment is recycled to the initial dilute solution feed. The remaining portion of the donor liquid is returned to donor storage without mixing, such that its solute concentration profile is maintained An equal volume of a liquid is added, without mixing, to the high concentration end of the stored donor portion to make up for the first donor portion sent to the dilute solution feed. The concentration of this recycle portion is less than the product concentration but generally characterized by having a significant concentration of solute. For example, in a preferred process wherein copper is recovered, this added recycle donor portion is a spent solution from an electrochemical recovery cell.

The process also requires treating the bed, after the bed has been eluted, with the stored receiver liquid, whereby liquid remaining in the bed is reduced in solute concentration. A first portion of the resulting bed effluent from the treatment is added to the product liquid and the remaining portion is returned to receiver storage, without mixing, such that its concentration profile is maintained. A portion of wash liquid equal in volume to that portion of receiver liquid sent to the product is added, without mixing, to the low concentration end of the stored receiver liquid.

Storing of the donor and receiver concentration profiles without mixing perferably employs an inert bed of particles. Preferred bed material is nonporous monodisperse spheres wherein the bed is configured such that plug flow of fluids in and out of the bed is established.

DETAILED DESCRIPTION OF THE INVENTION

The process of the invention is applicable to any adsorbent and any solute that binds thereto that can be removed therefrom by an eluent. Such absorbents include ion exchangers, chelation resins, activated carbon or other solid adsorbents. An eluent is generally defined as any liquid or chemical agent that removes adsorbed material or solute from an adsorbent. While the process of the invention is often described in terms of ion exchange or chelation resins bed operating in a copper leachate recovery system the invention is not limited to such system.

The liquid contents of an adsorbent or resin bed are characterized as: (1) "pore liquid", defined as the liquid trapped in the pores of the resin; and (2) "void liquid", defined as the bulk liquid surrounding the resin beads. There is no bulk liquid flow between the two liquids, but ions can move by diffusion. For example, when void liquid with a given copper concentration flows past beads whose pore liquid has a different copper concentration, copper will diffuse into or out of the pore liquid until its copper concentration reaches equilibrium with that of the void liquid. This will occur without regard to any copper adsorbed onto the solid surface inside the pore.

The resins chosen for the process of the invention elute solute when high concentration electrolyte concentrations or other compositions (depending upon the characteristics of the resin) are passed through the bed. A preferred resin bed of the invention is eluted by high acid concentration solutions.

In a preferred process of the invention, copper leachate solution from natural mine drainage, an acid leach tank or heap leaching, is passed through a bed of copper-selective adsorbent resin. The copper concentration and acid concentration of the dilute solution leachate are typically both low, ranging from 0.5 to 5.0 g/L. When the acid concentration of the void liquid is low, that of the pore liquid will also be low, which allows copper to adsorb onto the resin. Copper thus transfers from the void liquid into the pore liquid and onto the resin. The void liquid, now with a much lower copper concentration, is substantially barren of copper and is returned to the mine or leach pit to pick up more copper.

The loaded resin may then be eluted by passing a liquid having a high acid concentration through the bed. The product effluent from the bed having a high metal content may then be sent to a copper recovery process such as a conventional electrowinning process. In electrowinning, pure copper is electroplated from a concentrated solution of copper and sulfuric acid. The concentrated copper-containing solution is called an electrolyte. The copper concentration of the electrolyte must be greater than some minimum value related to the character of the process. For example, a typical electrowinning cell requires a copper concentration of at least 45 g/L. In such a process, copper is plated out until the copper concentration drops to a certain lower level. Such a lower concentration might be 30 g/L copper, typical of the previously-noted process. This spent electrolyte is removed from the electrowinning cell so that more copper can be added to it by some procedure such as the process of the present invention. Once enriched, the electrolyte is then returned to the electrowinning cell where more plating occurs. The electrolyte volume in this closed loop must be kept constant.

As noted above, to recover copper by electrowinning, it must be added to the spent electrolyte, which already has a high concentration of about 30 g/L copper. This is done by passing the spent electrolyte directly through the resin bed. The spent electrolyte also has a high sulfuric acid concentration, which desorbs the copper. The copper concentration in the liquid leaving the bed climbs rapidly from the leachate concentration to a high level and then slowly drops back to the spent electrolyte level as the elution ends and simple washing of the macroporous beads starts. Eventually, the pore liquid reaches the same copper and acid concentrations as the electrolyte in the voids.

Before the resin can be used to adsorb more copper from leachate, the acid in the pores must be washed out. The bed could be rinsed with clean water. The copper in this rinse must be recovered or the overall copper recovery will be low. The rinse would have a concentration below that of the electrolyte, so the copper cannot be recovered directly. There is a similar loss of copper when the resin is first washed with spent electrolyte. These rinses could be evaporated to boost the copper concentration to spent electrolyte levels, but the energy costs would be prohibitive A key element of the process of the invention requires storing and reusing these rinses so that the copper contained in them is recovered.

The stored rinses are labeled for purposes of describing the process of the invention as "receiver" and "donor" liquids. When the void liquid receives copper from the pore liquid, it is called receiver void liquid, and when it transfers copper to the pore liquid, it is called donor void liquid. When not in use in the process, donor and receiver void liquids are each kept in special storage containers, such as tanks or columns, that are substantially not mixed. As the void liquid is used, it is returned to the special tank to be used in the next cycle, but it is always prevented from mixing with the original tank contents. The copper concentration of both void liquids is below that of the electrolyte. The volume of both void liquids is controlled by the process at a constant value.

To clarify the description of the process, it is assumed that once copper mass transfer begins, it continues until almost all of the copper is transferred. In the first step, a resin bed is loaded with leachate The pore and void liquids are both at the barren copper concentration. The entire volume of donor void liquid is now passed through the bed. Copper is transferred from the void liquid to the pore liquid and thence to the adsorbent. This effectively supercharges the resin. Not all of the copper is transferred to the resin, so the donor void liquid leaving the resin bed has a copper concentration greater than that of the barren. The first portion has a concentration near that of the feed so it is recycled to the leachate adsorption step. The remaining donor void liquid is saved and stored for reuse in the next cycle in a non-mixing tank. The copper concentration of the pore liquid eventually reaches that of the electrolyte. To compensate for the volume of liquid recycled to leachate adsorption, an equal volume of spent electrolyte is added to the tank. This also balances the two copper outputs for the donor void liquid: (1) the leachate recycle; and (2) the resin supercharging, which consists of both adsorption and storage in the pore liquid at spent electrolyte concentration. This momentary volume decrease in the closed electrolyte system must be matched with a volume increase in a following process step, described below.

At this point, the void and pore liquids in the bed now have copper concentrations matching that of the spent electrolyte. The copper adsorbed onto the resin is desorbed by passing spent electrolyte through the bed. The high acid concentration in the void liquid leads to a high acid concentration in the pore liquid. Copper desorbs from the resin and diffuses from the pore liquid into the void liquid. This rich electrolyte is taken directly to electrowinning. This portion of the process does not affect the electrolyte volume, as every volume of spent electrolyte used is returned to electrowinning as rich electrolyte. Eventually all the copper is desorbed and the pore liquid copper and acid concentrations match those of the spent electrolyte.

In the next step, the entire receiver void liquid is passed through the bed. Copper in the pore liquid transfers into the void liquid. The first portion of receiver void liquid has a copper concentration nearly as high as that of the electrolyte and is added to the electrolyte loop. The volume added is controlled to match the volume removed in the donor void liquid step. The rest of the receiver void liquid is collected in the special non-mixed tank, for reuse. As receiver void liquid flow though the bed continues, the copper concentration in the pore liquid drops to that of the barren. To maintain the volume of the receiver void liquid, water is added to the recycle tank. Copper does not accumulate in the receiver liquid because the copper in the output to the electrolyte loop matches that received from the pore liquid. The net effect is that all the copper in the pore liquid is transferred into the water volume which is added to the receiver void liquid. This volume is in turn added to the electrolyte. The resin is regenerated for the next cycle of leachate loading, with the pore liquid free of copper and acid.

Examining the process of the invention in summary, a given volume of donor void liquid at feed concentration is removed from a closed system of donor/receiver void liquid and electrolyte. To keep the system volume balanced, an equal volume of water is added to the receiver void liquid. Copper enters the system adsorbed on resin and held in the interstitial void and internal pore liquids of the resin, and leaves as solid copper and in the feed-quality donor void liquid. Since the donor void liquid stream can be recycled by adding it to the fresh feed, it is not lost. It should be minimized, however, as adsorption of a large recycle copper stream will require larger beds of the expensive adsorbent. Minimized copper recycle in order to minimize the resin bed size is a key result of this invention.

A key element of the invention is storing the donor and receiver liquids such that each liquid's concentration profile is maintained. One way of making a special non-mixed tank to maintain concentration profiles and to minimize the donor void liquid output and, thus, the water input to the receiver void liquid, would be to divide each of the liquid volumes into a series of first, second, third, etc. n tanks. Copper would transfer between the pore and void liquids in exactly the same manner as previously described. The tanks would be piped in a cascade, so that liquid in the first tank could be pumped out to wash resin, the liquid in the second tank could then be pumped into the first tank the liquid in the third tank into the second tank and so forth. Then the liquid in the first tank would again be pumped out to wash the resin, the liquid in the second tank then pumped into the first tank the liquid in the third tank into the second tank and so on. This would be repeated until m tank volumes of liquid had been pumped through the bed. These m volumes would be the donor void liquid output and recycled with the leachate feed. At this point, m tanks at the n end of the cascade would be empty. Washing of the resin bed would continue with the next n-m tank volumes of donor liquid. As each volume of liquid leaves the resin bed, it would be sent back into the tank cascade at tank n. With each transfer, liquid in the first tank would wash the bed, the liquid in the second tank would move to the first tank the liquid in the third tank to the second tank and so on, with the liquid in tank n 15 transferred into tank n-1. The bed effluent would be placed in tank n. This would continue until there were m empty tanks at the 1 end of the cascade. Then the inter-tank transfers would continue, with tank m+1 pumping into tank m, tank m+2 into tank m+1, and so on until electrolyte is added to tank n. The inter-tank transfers would continue until all tanks were again filled with liquid. The first tank would contain donor liquid that was previously stored in tank m+1, passed through the resin bed and then returned to the cascade. Similarly, the donor liquid in the second tank would have been previously in tank m+2, passed through the resin bed and returned to the cascade, and so on for tanks 3, 4, 5, ... n−m. The last m tanks at the n end of the cascade would be filled to contain electrolyte.

During the copper transfer from the donor void liquid to the pore liquid, the change in the copper concentration of each tank volume of donor void liquid is determined by the copper concentrations of the pore liquid and of itself. The driving force for copper transfer is the difference in copper concentration between the two liquids. A higher difference will allow more copper to transfer from the donor liquid to the pore liquid. The effect of the pore liquid copper concentration is illustrated in the following discussion.

Assume that all n donor void liquid tanks have the same copper concentration and that the pore liquid has no copper. All liquid transfers proceed as described above. The tank numbers refer to the abovedescribed original tank numbers. When the donor liquid in the first tank is passed through the resin bed, most of the copper is transferred to the pore liquid so that the donor liquid leaving the bed has a very low copper concentration. The donor liquid in the second tank is now passed through the resin bed. Since the pore liquid already contains some copper, the driving force for copper transfer will be reduced, so that less copper will transferred and the donor liquid leaving the bed will have a higher copper concentration. Similarly, the donor liquid originally in the third tank is passed through the resin bed. This portion of the donor liquid will have an even higher copper concentration as it leaves the resin bed due to the higher copper concentration in the pore liquid. In this manner, a flat concentration profile will be changed into an increasing profile, bounded at the low end by the initial pore liquid concentration and at the upper end by the initial donor liquid concentration. If the first m tank volumes were removed and recycled to the leachate feed, the remaining n-m volumes could be stored back in the tank cascade as described above. Each time the donor liquid is recycled, the copper concentrations in the tanks will change until a steady state increasing concentration profile is reached, starting at a very low concentration and ending in a plateau of m tanks at the electrolyte concentration.

Analogously, the receiver void liquid output can be minimized by storage in a series of n tanks. In this case, the steady state tank concentration profile decreases with increasing total volume. The first m tanks, at near electrolyte concentration, will form the receiver void liquid output. The decreasing profile will end in m tanks containing very low copper concentrations.

In order to minimize copper recycle, the subdivision of the donor and receiver liquids into n parts must result in decreased donor and receiver liquid outputs and, thus, their respective inputs. The closer the donor liquid output volume to the total pore volume of the resin bed, the lower the copper content of the donor liquid output, but at the cost of a larger total donor liquid volume. Similarly, the closer the receiver liquid output volume to the total pore volume, the closer its concentration to that of the electrolyte, but at the cost of a larger total receiver liquid volume. In both cases, the larger n is, the smaller the donor and receiver output volumes.

The best system performance is obtained when large numbers of tanks are used in the donor and receiver liquid storage series. In terms of process hardware, however, this results in a complex and expensive process. The present invention solves the capital and complexity problems by storing and reusing the copper concentration profiles without subdivision of the liquids into discrete portions.

One alternative solution requires pumping the profiles into a pipe such that uniform plug flow occurs, with no back-mixing due either to turbulent flow or density differences. The pipe is one or more long, small diameter tubes, or a large diameter vertical column where the liquid velocity is low to minimize mixing. Denser liquids must be stored beneath lighter ones to prevent natural convection and the resulting back-mixing.

A preferred embodiment of the invention is a process using a vertical column packed with nonporous, nonadsorbent particles for storing liquids such that solute concentration profiles are maintained for long periods of time. In this inert bed, the liquid is stored in the interconnected voids between the particles. Bulk mixing is prevented even at high liquid velocities. The voids behave like an infinite series of differential tanks. Additional requirements of the system are a radially uniform particle size distribution, good liquid distribution at both the column top and bottom and a low concentration gradient. The first two requirements minimize channeling and bandspreading of the profile. The last reduces local diffusional mixing that would promote bandspreading.

Lighter liquids must always be stored over denser liquids inside the inert bed. To store a decreasing density concentration profile in an inert bed, the solution containing this profile must be fed through the top of the bed and the liquid previously filling the inert bed voids must be as dense as or denser than the first and densest portion of the liquid containing the concentration profile. Conversely, to store an increasing density concentration profile, the solution must be fed through the bottom of the bed and the liquid previously filling the inert bed voids must be as dense as or lighter than the first and lightest portion of the liquid containing the concentration profile. Concentration profiles so stored can be retrieved from the top of the bed by feeding denser liquid through the bottom or from the bottom of the bed by feeding lighter liquid through the top. Hardware and process control simplicity are reflected in capital cost reduction and process reliability for the inert bed system.

For copper concentration profile storage, the liquid density is a direct function of the copper concentration, so that low concentration solutions are stored above high concentrations. The previously described inert beds are used to store donor and receiver liquid copper concentration profiles for subsequent reuse as a way to minimize copper recycle while maximizing copper recovery in a process using chelation resin. Capital costs will be minimized, while reliability is maximized.

The inert material of the concentration profile storage bed preferably has a particle size distribution as narrow as possible. Particles are preferably spherical to obtain better bed packing. Particles must be chemically inert with respect to the ions present in the solutions being stored. Small glass spherical beads can fulfill all these conditions. Particles may be less than one centimeter in diameter. Limiting average particle sizes from 16 to 50 mesh (300–1000 micrometers) is advantageous, resulting in acceptably low pressure drops. Other inert materials are also suitable for bed particulates.

In establishing the suitability of a bed, tests may be run by feeding into a proposed bed a known concentration profile created by feeding batches of solutions of different concentrations, or by feeding a very well-known continuous concentration profile resulting from a physical or chemical mass transfer process. The concentration should vary monotonically upwardly or downwardly so that the requirement, described above, wherein lighter liquids must always be stored over denser liquids, is met.

As will be evident to those skilled in the art, the stored concentration profile process is suitable for many liquid phase adsorptions, in addition to copper or metal recoveries. It is not intended to limit application of the invention to metal recovery.

With respect to the stored concentration profile process, a liquid solution output, obtained from any process step, whose solute concentrations vary in time and whose density either remains significantly constant or changes just in one direction may be fed into a columnar bed of inert particles contained in a vessel. As the liquid is fed into the bed, it displaces out of the bed, the liquid previously filling the voids between particles. When the feed of liquid to the bed completed, the flow through the bed voids is stopped for a certain desired time. As the concentrations were varying while the solution was being fed into the bed, the stored solution contains a concentration profile along the bed's vertical axis. After storage time, the concentration profile can be sent to another point in the process by displacing it out through one end of the bed with liquid being fed through the other end into the bed.

The following example demonstrates a preferred embodiment of the process of the invention.

EXAMPLE

A pilot process of the invention is operated to produce a product electrolyte feed to a conventional copper electrowinning process. The electrowinning process requires an electrolyte feed having 45 g Cu/L and not more than 157 g $H_2SO_4$/L concentrations. The process produces pure copper and a spent electrolyte having 30 g Cu/L and 180 g $H_2SO_4$/L.

A Dow Chemical Company macroporous chelation resin DOWEX* XFS-43084* (*Trademark of The Dow Chemical Company) is chosen for its copper selectivity and Fe rejection to recover copper from a dilute mine leachate solution to feed to the electrowinning process. Three 1 m high and 22 mm diameter resin columns containing about 380 ml of resin each, comprising about 40 percent by volume interstitial space and about 30 percent by volume internal pore space are provided with appropriate distributors to ensure plug flow through the column. Three inert beds, each containing about 1140 ml of spherical, chemically inert and nonporous 0.6 mm diameter particles, comprising about 40 percent by volume interstitial space are configured for plug flow. Two of the inert beds provide separate storage for donor and receiver concentration profile liquids while the third inert bed receives one of the two profiles when it is flowed through a resin bed. The storage space in these inert beds is their interstitial spacing between the bed particles. Liquids are always stored in the inert beds such that the denser liquid is below lighter liquid to prevent natural convective mixing and subsequent concentration profile distortion.

A series of loadings of the resin bed with copper, employing a mine leachate containing 3 g Cu/L and 2 g H$_2$SO$_4$/L, each loading followed by elution employing spent electrolyte, are carried out. The following process streams and effluents are established, after the bed achieves steady state, after about 50 elution cycles.

TABLE I

STEADY STATE PROCESS STREAMS AND EFFLUENTS FOR PILOT PLANT RECOVERY OF COPPER

| Operation | Process Stream or Effluent | Cu Conc. Averages (Ranges)* g/L | H$_2$SO$_4$ g/L | Total Volume Per Cycle in Resin Bed Volumes (BV) 1 BV = 380 ml | Average Flow Rate During Cycle BV/Hr |
|---|---|---|---|---|---|
| Load Bed | Dilute Cu Solution Leachate | 3 | 2 | 7.00 | 14.0 |
| Donor Liquid Recycle | Donor Fluid from Profile Storage Bed to Resin Bed | 25(14→30) | 2 | 1.45 | 2.9 |
| | Bed Effluent Recycled to Leachate | 5(0→14) | 2 | 0.35 | 0.7 |
| | Bed Effluent Returned to Donor Storage | 25(14→30) | 2 | 1.45 | 2.9 |
| | Spent Electrolyte Added to Donor Storage | 30 | 180 | 0.35 | 0.7 |
| Elution | Spent Electrolyte Through Resin Bed | 30 | 180 | 1.50 | 3.0 |
| | Product Liquid | 45(30–70) | 157(0–180) | 1.50 | 3.0 |
| Receiver Liquid Wash | Receiver Fluid from Profile Storage Bed to Resin Bed | 8(20→0) | 180 | 1.45 | 2.9 |
| | Effluent Added to Product Liquid | 28(40→20) | 180 | 0.35 | 0.7 |
| | Bed Effluent Returned to Receiver Storage | 8(20→0) | 180 | 1.45 | 2.9 |
| | Wash Water Make Up Added to Receiver Storage | 0.2 | 5 | 0.35 | 0.7 |

*Ranges are reported within parenthesis. The arrows indicate monotonically increasing or decreasing concentration profiles as they are obtained. Hyphenated ranges indicate nonmonotonical concentration changes as the profile is obtained.

The above process of the invention achieves a minimum copper recovery from the chelation resin bed of 95 percent. The resin operates at less than maximum copper loading, reducing the need to use a high inventory substantially reducing capital and operating costs.

What is claimed is:

1. A process for recovering a solute from a dilute solution feed wherein said dilute solution is contacted with an adsorbent in a fixed bed of adsorbent particles, said solute elutable from said adsorbent by an eluent solution, said process comprising:

passing said dilute solution through said bed wherein said adsorbent is loaded with solute, resulting in an effluent from said bed that is barren with respect to said feed in concentration of solute;

eluting said bed with said eluent, forming effluent liquid portions having concentration profiles including (1) a donor portion having a concentration of solute ranging from barren to just less than a desired product concentration, (2) a product portion having a desired concentration of solute and (3) a receiver portion having a concentration of solute ranging from just less than product to barren concentration;

storing separately effluent portions (1) and (3) such that each portion maintains its concentration profile;

treating said bed, after said bed has adsorbed said solute, with said stored donor portion, whereby the amount of solute adsorbed and retained by the adsorbent is increased and a first portion of the resulting bed effluent is recycled to said dilute solution feed and the remaining portion is returned to donor storage such that its concentration profile is maintained;

adding, without mixing, to said stored donor portion, a portion of a less than product concentration liquid, equal in volume to said first portion of donor liquid sent to dilute solution feed;

treating said bed, after said bed has been eluted, with said stored receiver liquid whereby liquid remaining in said bed is reduced in solute concentration and a first portion of the resulting bed effluent is added to said product portion and the remaining receiver effluent portion is returned to receiver storage such that its concentration profile is maintained; and adding, without mixing, to said stored receiver liquid a portion of wash liquid equal in volume to that portion of receiver liquid sent to product, wherein said product portion is recovered and said loading, eluting, and subsequent steps are repeated to recover solute from additional dilute solution.

2. The process of claim 1 wherein said added liquid portion at less than product concentration added to said donor liquid is an eluent for the adsorbed solute.

3. The process of claim 1 wherein said solute is copper dissolved in a dilute leachate, said adsorbent is a bed of a copper selective chelation resin and said product is at a concentration sufficient for recovery of copper by electrowinning.

4. The process of claim 3 wherein said added liquid portion at less than product concentration, added to the donor liquid, is a spent solution from an electrochemical recovery cell.

5. A process for recovering a metal from a dilute leachate by adsorption in an adsorbent bed, wherein (a) leachate is passed through said adsorbent resin bed, wherein the metal is adsorbed by said adsorbent and the bed effluent and void liquid remaining in the bed are reduced to a substantially barren concentration, (b) the adsorbent is contacted with an eluent that elutes the metal, wherein the bed effluent ranges in concentration of metal over time during elution from (1) initial barren to less than but approaching a desired product metal concentration, to (2) a desired product metal concentration and to (3) a metal concentration less than product concentration, and (c) said adsorbent bed is washed to remove void liquid at less than product concentration, wherein void liquid metal concentration ranges from just less than product to barren concentration, said bed being regenerated for a next cycle of leachate absorption, said process comprising the steps of:

storing the initial effluent (1) from the elution step (b) as a donor void liquid having a concentration profile of metal of substantially barren to less than but approaching product concentration in a non-mixed state wherein said concentration profile is maintained;

storing effluent from the washing step (c), as a receiver void liquid having a concentration profile of metal of just less than product to barren concentration in a non-mixed state wherein said concentration profile is maintained;

treating said bed after said bed has been loaded with leachate with said donor void liquid wherein a first portion of the resulting bed effluent is recycled to said leachate of step (a) and the remaining of said donor liquid is returned to storage such that its concentration profile is maintained;

adding, without mixing, to said stored donor void liquid a portion of said less than product concentration liquid, equal in volume to said first portion of donor liquid recycled to leachate;

treating said bed, after elution of said desired metal product concentration portion, with said receiver void liquid wherein a first portion of the resulting bed effluent is added to the product portion and the remaining portion is returned to storage such that its concentration profile is maintained; and adding, without mixing, to said stored receiver void liquid a portion of wash liquid equal in volume to said first portion of receiver liquid sent to product, wherein after multiple cycles of said process, steady state stored concentration profiles are established and recycle of metal and wash liquid are minimized.

6. The process of claim 1 or 5 wherein storing each of said concentration profiles of donor and receiver liquid, without mixing, employs a bed of inert particles.

7. The process of claim 6 wherein said bed particles are chemically inert, nonporous and nearly spherical.

8. The process of claim 7 wherein said particles are sand, glass, polymeric or metal.

9. The process of claim 8 wherein said particles have a particle size of less than one centimeter.

10. The process of claim 1 or 5 wherein storing each of said concentration profiles of donor and receiver liquid without mixing employs a cascading series of separate tanks.

11. The process of claim 1 or 5 wherein storing each of said concentration profiles of donor and receiver liquid, without mixing, employs an elongated tube operating at non-turbulent, plug flow conditions.

12. The process of claim 1 or 5 wherein storing each of said concentration profiles of donor and receiver liquid, without mixing, employs a large diameter vertical column operating at non-turbulent, plug flow conditions.

13. The process of claim 1 wherein recovery of solute is continuous and includes a plurality of adsorbent beds operated in conjunction with a plurality of inert concentration profile storage beds.

14. The process of claim 13 including three adsorbent beds and three separate donor and receiver inert profile storage beds.

* * * * *